(12) United States Patent
Matsuki et al.

(10) Patent No.: US 12,291,659 B2
(45) Date of Patent: May 6, 2025

(54) TWO-PACK URETHANE-BASED ADHESIVE

(71) Applicant: SIKA TECHNOLOGY AG, Baar (CH)

(72) Inventors: Yuichi Matsuki, Hiratsuka (JP); Megumi Abe, Hiratsuka (JP); Kazuki Miura, Hiratsuka (JP)

(73) Assignee: SIKA TECHNOLOGY AG, Baar (CH)

( * ) Notice: Subject to any disclaimer, the term of this patent is extended or adjusted under 35 U.S.C. 154(b) by 179 days.

(21) Appl. No.: 18/271,563

(22) PCT Filed: Dec. 14, 2021

(86) PCT No.: PCT/JP2021/045916
§ 371 (c)(1),
(2) Date: Jul. 10, 2023

(87) PCT Pub. No.: WO2022/153761
PCT Pub. Date: Jul. 21, 2022

(65) Prior Publication Data
US 2024/0150615 A1  May 9, 2024

(30) Foreign Application Priority Data

Jan. 14, 2021 (JP) ................................. 2021-003983

(51) Int. Cl.
C09J 4/00 (2006.01)
C09J 11/04 (2006.01)
C09J 11/08 (2006.01)
C09J 175/04 (2006.01)

(52) U.S. Cl.
CPC ................. C09J 4/00 (2013.01); C09J 11/04 (2013.01); C09J 11/08 (2013.01); C09J 175/04 (2013.01)

(58) Field of Classification Search
CPC ..... C09J 4/00; C09J 11/04; C09J 11/08; C09J 175/04; C09J 175/08; C08G 18/10
See application file for complete search history.

(56) References Cited

FOREIGN PATENT DOCUMENTS

| JP | 2002-363525 A | 12/2002 | | |
|----|---------------|---------|---|---|
| JP | 2003-336028 A | 11/2003 | | |
| JP | 2007-031483 A | 2/2007 | | |
| JP | 2013199526 A * | 10/2013 | | |
| JP | 2014-079938 A | 5/2014 | | |
| JP | 2018-115298 A | 7/2018 | | |
| JP | 2019-214681 A | 12/2019 | | |
| WO | WO-2011118360 A1 * | 9/2011 | ............ | B32B 27/12 |
| WO | 2015/186555 A1 | 12/2015 | | |

OTHER PUBLICATIONS

Mar. 15, 2022 International Search Report issued in International Patent Appliction No. PCT/JP2021/045916.

* cited by examiner

Primary Examiner — Daniel McNally
(74) Attorney, Agent, or Firm — Oliff PLC

(57) ABSTRACT

A two-pack urethane-based adhesive that includes a second-pack liquid in which liquid components are inhibited from bleeding out and which can be inhibited from decreasing in thixotropic properties, and that gives cured products having, after aging, excellent adhesiveness. The two-pack urethane-based adhesive including a first-pack liquid, which includes a urethane prepolymer having an isocyanate group, and a second-pack liquid, which includes water, an active hydrogen compound (which is not water) having an active hydrogen capable of reacting with the isocyanate group, and cellulose nanofibers, wherein the first-pack liquid and the second-pack liquid each independently contain carbon black and/or an inorganic-based filler, the content of the cellulose nanofibers being 0.1-1.5 mass % with respect to the content of the water.

6 Claims, No Drawings

TWO-PACK URETHANE-BASED ADHESIVE

TECHNICAL FIELD

The present invention relates to a two-pack urethane-based adhesive.

BACKGROUND ART

In recent years, from the viewpoint of weight reduction, resin materials (for example, an olefin-based resin and a matrix resin for fiber-reinforced plastic (FRP), etc.) have been used in automobile bodies in place of steel sheets.

For bonding such a resin material and a dissimilar material (for example, glass), conventionally, a two-pack curing-type urethane adhesive composition having a main agent containing a urethane prepolymer and a curing agent has been proposed.

For example, Patent Document 1 describes, for the purpose of providing an adhesive composition exhibiting excellent curing properties and adhesion-developing properties, a two-pack urethane adhesive composition comprising: a main agent containing a urethane prepolymer; and a curing agent containing water and a bi- or higher functional active hydrogen-containing compound.

PRIOR ART DOCUMENTS

Patent Document

Patent Document 1: JP 2007-31483 A

SUMMARY OF THE INVENTION

Problems to be Solved by the Invention

Referring to Patent Document 1, the present inventors prepared a two-pack urethane-based adhesive composition including a main agent (a first-pack liquid) and a curing agent (which refers to a curing agent in a broad sense and can also be referred to as a second-pack liquid), in which the second-pack liquid includes water in addition to an active hydrogen compound such as a polyol and a filler (carbon black and/or an inorganic-based filler and there may be cases where carbon black and the inorganic-based filler are collectively referred to as a "filler"), and performed evaluation thereon. In general, the active hydrogen compound used as a curing component (which is a curing agent in a narrow sense) with respect to a urethane prepolymer in the urethane-based adhesive composition is usually liquid under room temperature conditions (around 23° C.).

As a result of the abovementioned evaluation, it is clear that in the second-pack liquid, the liquid components (where the liquid components include water and/or active hydrogen compound which are blended in the second-pack liquid; the same applies hereinbelow) may gradually bleed out from the second-pack liquid over time.

Specifically, the present inventors confirmed a phenomenon, namely that, when the second-pack liquid containing water, etc. as described above is placed in a relatively high temperature environment (for example, a temperature of about 40°) for a long period of time (for example, about 6 months), even if the second-pack liquid is stored in a sealed state, water, etc. gradually bleeds out over time in the vicinity of the surface (not the inner part of the second-pack liquid, but the interface between the air and the second-pack liquid) of the second-pack liquid.

In addition, it is clear that the thixotropic properties of the second-pack liquid containing an active hydrogen compound, filler and water as described above may deteriorate over time when this second-pack liquid is stored for a long period of time (for example, in a sealed state at 40° C. for 6 months).

As described above, the bleed out of the liquid components in the second-pack liquid and the decrease in the thixotropic properties of the second-pack liquid are considered to cause poor curing when mixed with the first-pack liquid and curing is performed.

In addition, a cured product of the two-pack urethane-based adhesive composition is for long-term use and thus requires adhesiveness after aging.

Accordingly, an objective of the present invention is to provide a two-pack urethane-based adhesive in which liquid components in the second-pack liquid are inhibited from bleeding out and which can be inhibited from decreasing the thixotropic properties of the second-pack liquid.

Means for Solving the Problems

The present inventors carried out extensive studies in order to solve the abovementioned problems, and as a result, they have found out that the desired effects can be obtained when the second-pack liquid includes cellulose nanofibers (CNF) in an amount in a specific range, and thus they arrived at the present invention.

The present invention is based on the abovementioned knowledge, etc., and specifically, the invention solves the abovementioned problems with the following configurations:

[1] a two-pack urethane-based adhesive comprising:
a first-pack liquid including a urethane prepolymer having an isocyanate group; and
a second-pack liquid including water, an active hydrogen compound (except water) having an active hydrogen capable of reacting with the isocyanate group, and cellulose nanofibers,
wherein the first-pack liquid and the second-pack liquid each independently contain carbon black and/or an inorganic-based filler, and
the content of the cellulose nanofibers is 0.1-1.5 mass, with respect to the content of the water;

[2] the two-pack urethane-based adhesive as described in [1],
wherein the urethane prepolymer at least has a polyether skeleton, and
the active hydrogen compound includes a polyether polyol;

[3] the two-pack urethane-based adhesive as described in [1] or [2],
wherein the molar ratio, B/A, of (A) the number of moles of the isocyanate group of the urethane prepolymer in the first-pack liquid and (B) the number of moles of the active hydrogen of the active hydrogen compound in the second-pack liquid is 0.1 or more and less than 1.0;

[4] the two-pack urethane-based adhesive as described in any one of [1] to [3], wherein the first-pack liquid and the second-pack liquid each independently further include a tertiary amine and a tin-based or bismuth-based metal complex;

[5] the two-pack urethane-based adhesive as described in any one of [1] to [4], wherein the content of water is 0.1-3.0 mass % in the second-pack liquid; and

[6] the two-pack urethane-based adhesive as described in any one of [1] to [5], wherein the first-pack liquid and the second-pack liquid each independently include the carbon black and at least one selected from the group consisting of calcium carbonate and silica as the inorganic-based filler.

Effects of the Invention

According to the two-pack urethane-based adhesive of the present invention, bleed out of the liquid components in the second-pack liquid and deterioration in the thixotropic properties of the second-pack liquid can be suppressed, and a resulting cured product exhibits an excellent adhesiveness even after aging.

MODES FOR CARRYING OUT THE INVENTION

Hereinbelow, the present invention will be described in more detail.

In the present specification, "(meth)acryl" represents "acryl" or "methacryl".

In addition, the numerical value range represented as "-" in the present specification represents a range that includes the numbers before and after the "-" as the lower limit value and upper limit value.

In the present specification, unless otherwise specified, for each component, substances corresponding to each component may be used singly or two or more kinds may be used in combination. When the component includes two or more kinds of substances, the content of the component refers to the total content of the two or more substances.

In the present specification, a case where at least one of the following is superior may be described as the effect of the invention being superior: "bleed out of the liquid components in the second-pack liquid being suppressed"; "deterioration in thixotropic properties of the second-pack liquid being suppressed"; and "after aging, adhesiveness of a cured product obtained being excellent".

[Two-Pack Urethane-Based Adhesive]

The two-pack urethane-based adhesive of the invention (adhesive of the invention) is a two-pack urethane-based adhesive (two-pack urethane-based adhesive composition) comprising: a first-pack liquid including a urethane prepolymer having an isocyanate group; and a second-pack liquid including water, an active hydrogen compound (except water) having an active hydrogen capable of reacting with the isocyanate group, and cellulose nanofibers (CNF), in which the first-pack liquid and the second-pack liquid each independently contain carbon black and/or an inorganic-based filler, and the content of the cellulose nanofibers is 0.1-1.5 mass % with respect to the content of the water.

The adhesive of the invention is considered to exhibit desired effects by virtue of comprising such a configuration. Although the reason is not clear, it is presumed to be approximately as follows.

The effect of suppressing the bleed out of CNF in the second-pack liquid means the effect of suppressing the bleed out phenomenon that occurs during storing (preserving) the second-pack liquid. The bleed-out phenomenon tends to occur in the vicinity of the surface [not the inner part of (the blended composition of) the second-pack liquid, but the interface part between the air and the (blended composition of) the second-pack liquid] where the mobility of the substances constituting (the blended composition of) the second-pack liquid is more likely to increase, and due to the issue of compatibility between the constituent substances [compatibility between a filler (carbon black and/or inorganic-based filler), water and active hydrogen compound (which is usually a liquid substance under a room temperature condition as described above, such as polyol) having active hydrogen capable of reacting with the isocyanate group], the liquid components (especially, low-molecular-weight liquid components) gradually bleed out on the surface over time.

According to the invention, it is considered that the bleed out phenomenon of the liquid components is suppressed by virtue of including CNF in the second-pack liquid as a result of CNF having a strong hydrophilicity.

In addition, when an inorganic filler component with a high specific weight (such as calcium carbonate) is used in the second-pack liquid, it is inferred that entanglement of the CNF fibers can prevent precipitation of the inorganic filler component with a high specific weight.

Next, in regard to the thixotropic properties of the second-pack liquid, in general, the thixotropic properties of (the blended composition of) the second-pack liquid are caused primarily by the occurrence (low shear rate region) and disappearance (high shear rate region) of interparticle interactions between fillers.

The thixotropic properties of (the blended composition of) the second-pack liquid deteriorate by gradual wetting of the filler with the liquid components due to a long-term storage of (the blended composition of) the second-pack liquid (about 6 months at 40° C. in a sealed state).

However, according to the invention, it is confirmed that deterioration in the thixotropic properties of (the blended composition of) the second-pack liquid can be suppressed by including CNF in the system of (the blended composition of) the second-pack liquid.

It can be inferred that the thixotropic properties of the second-pack liquid are maintained by entanglement of the CNF fibers in the second-pack liquid or by CNF preventing the filler from getting gradually wet due to the liquid components.

In addition, according to the invention, it is confirmed that CNF does not impair the adhesiveness of a cured product obtained after aging when CNF is used in a predetermined amount.

Herein, the abovementioned mechanism is an assumption made by the present inventors and mechanism of the invention is not limited thereto.

Hereinbelow, each component contained in the adhesive of the invention will be described.

[Two-Pack Urethane-Based Adhesive]

The adhesive of the invention is a two-pack urethane-based adhesive including a first-pack liquid and a second-pack liquid. The adhesive of the invention forms a urethane-based cured product after curing.

<<First-Pack Liquid>>

According to the invention, the first-pack liquid includes a urethane prepolymer having an isocyanate group.

<Urethane Prepolymer>

The urethane prepolymer is a urethane-based compound having an isocyanate group.

In the urethane prepolymer, the bonding position of the isocyanate group is not particularly limited, but an embodiment in which the isocyanate group is bonded at the terminal of the urethane prepolymer can be cited as one of preferred embodiments.

A urethane prepolymer having a plurality of isocyanate groups can be cited as one of preferred embodiments.

As the urethane prepolymer, conventionally well-known prepolymers may be used. For example, a reaction product obtained by reacting a polyisocyanate compound and a compound (hereinafter, this will be abbreviated as "active hydrogen compound") having two or more active hydrogen-containing groups in one molecule, in such a way that the isocyanate group is excessive with respect to the active hydrogen-containing groups, or the like, may be used.

In the invention, the active hydrogen-containing group means a group containing active hydrogen. Examples of the active hydrogen-containing group include a hydroxy group, an amino group and an imino group.

(Polyisocyanate Compound)

The polyisocyanate compound that can be used in producing the urethane prepolymer is not particularly limited as long as it has two or more isocyanate groups in the molecule.

Examples of the polyisocyanate compound include: an aromatic polyisocyanate compound such as toluene diisocyanate (TDI), diphenylmethane diisocyanate (MDI), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalenediisocyanate (NDI) and triphenylmethane triisocyanate;

aliphatic (where concept of the aliphatic is to include linear, branched and alicyclic forms) polyisocyanates such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatomethyl)cyclohexane ($H_6$XDI) and dicyclohexyl methane diisocyanate ($H_{12}$MDI); and carbodiimide-modified polyisocyanates thereof.

The polyisocyanate compounds may be used alone or in combination of two or more kinds.

From among these, in light of excellent curability, aromatic polyisocyanate compounds are preferable, and MDI is more preferable.

(Active Hydrogen Compound)

The compound (active hydrogen compound) having two or more active hydrogen-containing groups in one molecule which can be used in producing the urethane prepolymer is not particularly limited. Examples of the active hydrogen-containing group include a hydroxyl (OH) group, an amino group and an imino group.

Examples of the active hydrogen compound preferably include a polyol compound having two or more hydroxyl (OH) groups in one molecule, a polyamine compound having two or more amino group and/or imino group in one molecule, and the like. In particular, a polyol compound is preferable.

The polyol compound is not particularly limited as long as it is a compound having two or more OH groups. Specific examples of the polyol compound include: polyether polyols; polyester polyols; (meth)acryl polyols; polybutadiene polyol and hydrogenated polybutadiene polyols; low-molecular-weight polyhydric alcohols; and mixed polyols thereof. In particular, a polyether polyol can be cited as a preferred embodiment.

The polyether polyol is not particularly limited as long as it is a compound having polyether as a main chain (skeleton) and two or more hydroxy groups. Polyether is a group having two or more ether bonds, and a specific example thereof includes a group having two or more of the structural unit —$R^a$—O—$R^b$ in total. Herein, $R^a$ and $R^b$ in the structural unit each independently represent a hydrocarbon group. The hydrocarbon group is not particularly limited, and examples include a linear alkylene group having 1 to 10 carbon atoms and a branched alkylene group having 3 to 10 carbon atoms.

Examples of the polyether polyol include: polyoxyethylene diol (polyethylene glycol); polyoxypropylene diol (polypropylene glycol: PPG); polyoxypropylene triol; polyoxyalkylene-based tetraol; polyols of a copolymer of ethyleneoxide/propyleneoxide; polytetramethylene ether glycol (PTMEG); polytetraethylene glycol; sorbitol-based polyol; and the like.

The polyether polyol for use in producing the urethane prepolymer is preferably polypropylene glycol or polyoxypropylene triol from the viewpoint of excellent compatibility with the polyisocyanate.

The weight average molecular weight of the polyether polyol is preferably from 500 to 20,000 from the viewpoint of the viscosity of the urethane prepolymer obtained through a reaction with the isocyanate compound which provides an appropriate fluidity at normal temperature. In the invention, the weight average molecular weight is obtained by means of GPC method (solvent: tetrahydrofuran (THF)) in terms of polystyrene.

The active hydrogen compounds may be used alone or in combination of two or more kinds.

The urethane prepolymer preferably has at least a polyether skeleton in addition to the isocyanate group from the viewpoint of providing further excellent effects of the invention. The polyether skeleton can be derived from the polyether polyol used as the active hydrogen compound, for example.

The urethane prepolymer is preferably a urethane prepolymer obtained by reacting polyether polyol with an aromatic polyisocyanate compound from the viewpoint of providing further excellent effects of the invention.

The urethane prepolymer may be used singly or two or more kinds can be used in combination.

(Urethane Prepolymer Content)

In the first-pack liquid, the content of the urethane prepolymer is preferably from 5 to 90 mass %, more preferably from 20 to 70 mass %, from the viewpoint of providing further excellent effects of the invention.

The method for producing the urethane prepolymer is not particularly limited. For example, the urethane prepolymer can be produced by using a polyisocyanate compound such that 1.5-2.5 mols of isocyanate groups react with respect to 1 mol of an active hydrogen-containing group (e.g., hydroxy group) in the active hydrogen compound, and mixing and reacting the same.

The urethane prepolymer may also include an unreacted polyisocyanate compound.

When producing the urethane prepolymer in the above-mentioned manner, a plasticizer may also be used. The plasticizer is not particularly limited as long as it is a compound that does not exhibit any reactivity with respect to the polyisocyanate compound, active hydrogen compound and urethane prepolymer and that enables plasticization in the reaction system.

Examples of the plasticizer include esters such as diisononyl phthalate (DINP) and dioctyl adipate.

The content of the plasticizer is preferably from 5 to 20 mass % in the first-pack liquid from the viewpoint of providing further excellent effects of the invention.

The plasticizer used in producing the urethane prepolymer may be included in the first-pack liquid.

According one of preferred embodiments of the invention, the urethane prepolymer does not include a blocked isocyanate compound (a compound in which the isocyanate group is blocked with a blocking agent).

(Isocyanate Group Content)

The content of the isocyanate group in the urethane prepolymer is preferably from 0.5 to 5.0 masse in the total amount of the urethane prepolymer from the viewpoint of providing further excellent effects of the invention.

When the first-pack liquid further includes a plasticizer, the content of the isocyanate group in the urethane prepolymer is preferably from 0.4 to 4.5 mass % in the total amount of the urethane prepolymer and plasticizer from the viewpoint of providing further excellent effects of the invention.

(Method of Measuring the Content of Isocyanate Group)

The content of the isocyanate group in the urethane prepolymer can be measured by subjecting the urethane prepolymer to measurement with the method A in accordance with JIS K1603-1:2007 by using a potentiometric titration device.

When the urethane prepolymer is a mixture with a plasticizer, etc., the content of the isocyanate group in this mixture can be measured by subjecting the mixture to measurement with the method A in accordance with JIS K1603-1:2007 by using a potentiometric titration device.

<<Second-Pack Liquid>>

According to the invention, the second-pack liquid includes water, an active hydrogen compound (excluding water) having active hydrogen capable of reacting with the isocyanate group, and cellulose nanofibers.

When crosslinking urethane prepolymers (forming urea bonds) with water, foaming generally takes place due to carbon dioxide gas.

In the invention, since the second-pack liquid includes, in addition to water, an active hydrogen compound having higher reactivity with the isocyanate group as compared to water, this foaming can be suppressed and excellent adhesiveness can be achieved.

<Water>

The water included in the second-pack liquid is not particularly limited. For example, tap water or distilled water can be used.

(Content of Water)

The content of water is preferably from 0.1 to 3.0 mass % in the second-pack liquid from the viewpoint of providing further excellent effects of the invention.

In addition, in the total amount of the adhesive of the invention, the content of water is preferably 1.0 mass % or less, more preferably from 0.01 to 0.5 mass %, from the viewpoint of providing further excellent effects of the invention.

Furthermore, the content of water is preferably 2.0 parts by mass or less, more preferably from 0.02 to 1.0 parts by mass, with respect to 100 parts by mass of the urethane prepolymer, from the viewpoint of providing further excellent effects of the invention.

<Active Hydrogen Compound>

According to the invention, the second-pack liquid includes an active hydrogen compound having active hydrogen capable of reacting with the isocyanate group. However, water is excluded from the active hydrogen compound. Also, the active hydrogen compound having active hydrogen capable of reacting with the isocyanate group does not include cellulose nanofibers.

Since the active hydrogen compound has active hydrogen, it can undergo reaction with the isocyanate group in the urethane prepolymer.

The active hydrogen compound is preferably in a liquid form under room temperature conditions (23° C.).

(Active Hydrogen Capable of Reacting with Isocyanate Group)

The active hydrogen compound preferably has, per molecule, a plurality of active hydrogens capable of reacting with the isocyanate group.

The active hydrogen capable of reacting with the isocyanate group, which is in the active hydrogen compound, can form an active hydrogen-containing group such as a hydroxy group, an amino group and an imino group.

Examples of the active hydrogen compound preferably include a polyol compound having two or more hydroxyl (OH) groups in one molecule, a polyamine compound having two or more amino group ($-NH_2$) and/or imino group ($-NH-$) in one molecule, and the like. In particular, a polyol compound is preferable.

The polyol compound is not particularly limited as long as it is a compound having two or more OH groups. Specific examples of the polyol compound include: polyether polyols; polyester polyols; (meth)acryl polyols; polybutadiene polyols and hydrogenated polybutadiene polyols; low-molecular-weight polyhydric alcohols; and mixed polyols thereof.

The active hydrogen compound preferably includes polyether polyol from the viewpoint of providing further excellent effects of the invention.

The polyether polyol to be included in the second-pack liquid as the active hydrogen compound can be the same polyether polyol that used as the active hydrogen compound when producing the urethane prepolymer.

In addition, the polyether polyol to be included in the second-pack liquid as the active hydrogen compound may have a nitrogen atom in the main chain structure.

The polyether polyol to be included in the second-pack liquid as the active hydrogen compound preferably includes polyether triol and/or polyether tetraol, more preferably includes polyether triol and polyether tetraol, from the viewpoint of providing further excellent effects of the invention.

(Polyether Triol)

An example of the polyether triol (trifunctional polyether polyol) includes a compound having, in one molecule, three hydroxy groups and polyether in the skeleton.

Specific examples of the polyether triol include polyoxyalkylene-based triol such as polyoxyethylene triol and polyoxypropylene triol.

The content of the polyether triol is preferably 80 mass % or more, more preferably from 85 to 98 mass % in the total amount of the active hydrogen compound, from the viewpoint of providing further excellent effects of the invention.

(Polyether Tetraol)

An example of the polyether tetraol (tetrafunctional polyether polyol) includes a compound having, in one molecule, four hydroxy groups and polyether as a skeleton. The polyether tetraol may also have nitrogen atoms in the main chain structure.

Examples of the polyether tetraol include polyoxyethylene tetraols, a compound represented by the following formula (4):

[Chemical Formula 1]

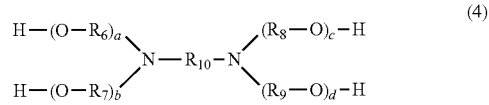

In formula (4), $R_6$-$R_9$ each independently represent a propylene group and/or an ethylene group, $R_{10}$ represents an alkylene group having 2 to 10 carbon atoms, and a-d each independently represent 1 to 10. At least one of a to d is 3 or greater.

Examples of the alkylene group having 2 to 10 carbon atoms include an ethylene group, a tetramethylene group, a pentylene group, a hexylene group, an octylene group and a decylene group. The alkylene group having 2 to 10 carbon atoms is preferably an ethylene group.

In regard to the polyether serving as a skeleton, when a in the formula (4) is 3 or greater, for example, H—(O—R$_6$)$_a$- forms polyether having a hydroxy group at the terminal. The same applies to b to d.

From the viewpoint of providing further excellent effects of the invention, the polyether tetraol to be included in the second-pack liquid as the active hydrogen compound is preferably a substance having nitrogen atoms in the main chain structure, and is preferably the compound represented by formula (4) above.

The weight average molecular weight of the polyether tetraol is preferably from 200 to 2000, more preferably from 400 to 800 from the viewpoint of providing further excellent effects of the invention.

According to the invention, the weight average molecular weight of the active hydrogen compound (for example, polyols such as the abovementioned polyether tetraol) can be provided in terms of polystyrene according to gel permeation chromatography using a THF (tetrahydrofuran) solvent. The measurement method and measurement conditions for the weight average molecular weight of the active hydrogen compound according to the invention are shown below.

(Measurement Method and Measurement Conditions for Weight Average Molecular Weight of Active Hydrogen Compound)

GPC: LC Solution (manufactured by SHIMAZU)

Detector: SPD-20A (manufactured by SHIMAZU)

Column: Two Shim-pack GPC-801, trade name (manufactured by SHIMAZU), are arranged in series Solvent: Tetrahydrofuran Temperature: 40° C.

Flow rate: 0.5 ml/min

Concentration: 2 mg/ml

Reference standard: Polystyrene

The content of the polyether tetraol is preferably 20 mass % or less, more preferably from 1 to 10 mass' in the total amount of the active hydrogen compound, from the viewpoint of providing further excellent effects of the invention.

Monoether Polyol

When the active hydrogen compound includes polyether polyol, the active hydrogen compound may further include monoether polyol.

The monoether polyol is a compound having a plurality of hydroxy groups and at least one ether bond. However, the ether bond in the monoether polyol does not form a polyether skeleton.

The monoether polyol preferably has 3 or 4 hydroxy groups per molecule.

The monoether polyol may have 1 to 4 ether bonds per molecule.

An example of the monoether polyol includes a compound represented by the following formula (5).

[Chemical Formula 2]

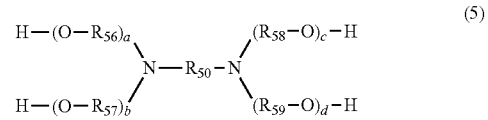

In formula (5), R$_{56}$-R$_{59}$ each independently represent a propylene group and/or an ethylene group, R$_{50}$ represents an alkylene group having 2 to 10 carbon atoms, and a to d each independently represent 1 or 2. At least one of a to d is 2.

Examples of the alkylene group having 2 to 10 carbon atoms include an ethylene group, a tetramethylene group, a pentylene group, a hexylene group, an octylene group and a decylene group. The alkylene group having 2 to 10 carbon atoms is preferably an ethylene group.

The weight average molecular weight of the monoether polyol is preferably from 100 to 1000, more preferably from 200 to 500, from the viewpoint of providing further excellent effects of the invention.

The content of the monoether polyol is preferably from 0 to 10 mass %, more preferably from 1 to 10 mass in the total amount of the active hydrogen compound, from the viewpoint of providing further excellent effects of the invention.

(Molar Ratio B/A)

The molar ratio, B/A, of (A) the number of moles of the isocyanate group of the urethane prepolymer in the first-pack liquid included in the adhesive of the invention and (B) the number of moles of the active hydrogen of the active hydrogen compound in the second-pack liquid included in the adhesive of the invention is preferably 0.1 or more and less than 1.0, more preferably from 0.2 to 0.5, from the viewpoint of providing further excellent effects of the invention.

<Cellulose Nanofibers>

According to the invention, the second-pack liquid includes cellulose nanofibers (CNF).

The thickness of the cellulose nanofiber is preferably 100 nm or less, more preferably from 3 to 10 run, from the viewpoint of proving further excellent effects of the invention.

The length of the cellulose nanofiber is preferably from 0.5 to 50 μm from the viewpoint of providing further excellent effects of the invention.

In regard to the thickness of the cellulose nanofiber, wet cellulose nanofibers are filtered and subjected to solvent removal in order to obtain a fine fiber sheet, the same is freeze-dried in liquid nitrogen, and observation is made with a scanning electron microscope (SEM) at a magnification of 100 to 10,000 folds. The average width value of 50 fibers observed by the above observation can be taken as the thickness of the cellulose nanofibers.

In regard to the length of cellulose nanofibers, cellulose nanofibers are observed in the same manner as above, and the average length value of 50 fibers can be taken as the length of the cellulose nanofibers.

From the viewpoint of providing further excellent effects of the invention, the CNF preferably has a functional group, and more preferably has a carboxy group as the functional group. The carboxy group may form a carboxy ion or salt (for example, sodium salt).

When the CNF has a functional group, the CNF may have a hydroxymethyl group and/or hydroxy group derived from cellulose, in addition to the functional group.

The method for producing CNF is not particularly limited. For example, conventionally well-known methods can be cited. An example of the method for producing cellulose fibers when CNF has a functional group includes a method in which a starting cellulose material (e.g., starting cellulose fiber material) with no functional group is used, and some or all of hydroxyl groups in the starting cellulose material are substituted with the functional group by a conventionally well-known method.

<Content of Cellulose Nanofibers>

According to the invention, the content of the cellulose nanofibers is 0.1 mass % to 1.5 mass % with respect to the content of water.

The content of the cellulose nanofibers is preferably from 0.1 to 1.2 mass % with respect to the content of water, from the viewpoint of providing further excellent effects of the invention.

As the form of CNF, a mixture including CNF and water can be cited, for example.

According to the invention, when CNF is the abovementioned mixture, the content of the cellulose nanofibers means the net cellulose nanofiber content in the mixture.

<Carbon Black and/or an Inorganic-Based Filler>

According to the invention, the first-pack liquid and second-pack liquid each independently include carbon black and/or an inorganic-based filler. Herein, the inorganic-based filler excludes carbon black.

(Carbon Black)

The carbon black to be independently included in each of the first-pack liquid and second-pack liquid is not particularly limited. Examples thereof include super abrasion furnace (SAF), intermediate super abrasion furnace (ISAF), high abrasion furnace (HAF), fast extruding furnace (FEF), general purpose furnace (GPF) and semi-reinforcing furnace (SRF).

(Inorganic-Based Filler)

Examples of the inorganic-based filler to be independently included in each of the first-pack liquid and second-pack liquid include calcium carbonate, silica, talc, mica and the like. The inorganic-based filler may be surface treated. The surface treatment is not particularly limited.

When the first-pack liquid and second-pack liquid each independently include the inorganic-based filler, the inorganic-based filler preferably includes calcium carbonate and/or silica from the viewpoint of providing further excellent effects of the invention.

The first-pack liquid and second-pack liquid preferably each independently include the carbon black and at least one selected from the group consisting of calcium carbonate and silica as the inorganic-based filler from the viewpoint of providing further excellent effects of the invention. (That is, the first-pack liquid and second-pack liquid preferably each independently include at least one selected from the group consisting of carbon black, calcium carbonate and silica from the viewpoint of providing further excellent effects of the invention).

The first-pack liquid preferably includes carbon black and an inorganic-based filler, more preferably carbon black and calcium carbonate, from the viewpoint of providing further excellent effects of the invention.

When the first-pack liquid includes carbon black, the content of the carbon black is preferably from 10 to 30 mass % in the first-pack liquid from the viewpoint of providing further excellent effects of the invention.

When the first-pack liquid includes the inorganic-based filler, the content of the inorganic-based filler is preferably from 10 to 30 mass % in the first-pack liquid from the viewpoint of providing further excellent effects of the invention.

Also, when the first-pack liquid includes carbon black and inorganic-based filler, the content of the carbon black and the content of the inorganic-based filler are the same as above.

The second-pack liquid preferably includes the inorganic-based filler, more preferably includes calcium carbonate and/or silica, even more preferably includes calcium carbonate and silica, from the viewpoint of providing further excellent effects of the invention.

When the second-pack liquid includes the inorganic-based filler, the content of inorganic-based filler is preferably from 10 to 35 mass % in the first-pack liquid from the viewpoint of providing further excellent effects of the invention.

In the second-pack liquid, the content of carbon black is preferably from 0 to 30 mass % in the second-pack liquid from the viewpoint of providing further excellent effects of the invention.

(Catalyst)

Preferably, the first-pack liquid and second-pack liquid each independently further include a catalyst from the viewpoint of providing further excellent effects of the invention.

The catalyst can accelerate a reaction between the urethane prepolymer in the first-pack liquid and the active hydrogen compound or water in the second-pack liquid.

In addition, preferably, the first-pack liquid and second-pack liquid each independently include, as a catalyst, a tertiary amine compound and a tin-based or bismuth-based metal complex, from the viewpoint of providing further excellent effects of the invention.

Tertiary Amine Compound

The tertiary amine compound is a compound having a tertiary amino group (in which three carbon atoms are bonded to a nitrogen atom, and a hydrogen atom is not bonded to the nitrogen atom).

Examples of the tertiary amine compound include 1,4-diazabicyclo[2.2.2]octane, 2,4,6-tris(dimethylaminomethyl)phenol, 2-methyltriethylenediamine, dimorpholinodiethylether structure-containing compounds, and the like.

The tertiary amine compound preferably includes the dimorpholinodiethylether structure from the viewpoint of providing further excellent effects of the invention.

The dimorpholinodiethylether structure is a structure having dimorpholinodiethylether as a base skeleton.

In the dimorpholinodiethylether structure, a hydrogen atom of the morpholine ring may be substituted with a substituent. The substituent is not particularly limited. An example thereof includes an alkyl group. Examples of the alkyl group include a methyl group and an ethyl group.

An example of the amine-based catalyst including a dimorpholinodiethylether structure includes a compound represented by the following formula (9):

[Chemical Formula 3]

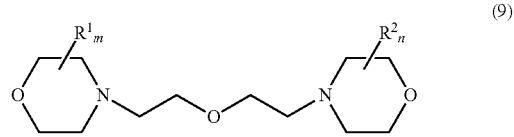

(9)

In formula (9) above, R and $R^2$ are each independently an alkyl group, and m and n are each independently 0, 1 or 2.

Specific examples of the amine-based catalyst including a dimorpholinodiethylether structure include dimorpholinodiethylether (DMDEE), di(methylmorpholino)diethylether and di(dimethylmorpholino)diethylether.

The tertiary amine compound preferably includes dimorpholinodiethylether (DMDEE) and/or 2-methyltriethylenediamine from the viewpoint of providing further excellent effects of the invention.

(Tin-Based Metal Complex)

Examples of the tin-based metal complex serving as a catalyst having tin include carboxylic acid esters of tin such as dimethyltin dilaurate, dibutyltin dilaurate, dibutyltin maleate, dibutyltin diacetate, and tin octoate.

(Bismuth-Based Metal Complex)

Examples of the bismuth-based metal complex serving as a catalyst having bismuth include carboxylic acid esters of bismuth, such as bismuth octanoate (specifically, bismuth trioctate, for example).

The first-pack liquid preferably includes a tertiary amine compound and a bismuth-based metal complex, more preferably includes an amine-based catalyst including a dimorpholinodiethylether structure and a bismuth-based metal complex, and even more preferably includes DMDEE and a bismuth-based metal complex, from the viewpoint of providing further excellent effects of the invention.

The second-pack liquid preferably includes a tertiary amine compound and a tin-based metal complex, more preferably 2-methyltriethylenediamine and dibutyltin dilaurate, from the viewpoint of providing further excellent effects of the invention.

When the first-pack liquid contains a catalyst, the content of the catalyst can be selected as appropriate. When the first-pack liquid contains a catalyst, the content of the catalyst can be 1 mass % or less in the total amount of the first-pack liquid, for example. When the second-pack liquid contains a catalyst, the same applies for the content of the catalyst in the total amount of the second-pack liquid.

(Other Optional Components)

The adhesive of the invention may also additionally contain an additive as necessary within the scope of not impairing the objective of the invention.

Examples of the additive include a plasticizer, an antiaging agent, an antioxidant, a silane coupling agent, an adhesion promoter, a UV absorber, a flame retardant, a surfactant and the like.

The content of the additive or selecting whether to add the additive to the first-pack liquid or second-pack liquid can be selected, as appropriate.

Plasticizer Examples of the plasticizer include: diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, butylene glycol adipate polyester; and the like. These may be used alone or in combination of two or more kinds.

(Production Method)

The method for producing the adhesive of the invention is not particularly limited, and for example, the adhesive can be produced by a method in which components included in the first-pack liquid and components included in the second-pack liquid are placed in separate containers and mixed in each container under a nitrogen gas atmosphere.

In regard to the method of using the adhesive of the invention, the first-pack liquid and second-pack liquid are mixed to be used. The method of mixing the first-pack liquid and second-pack liquid is not particularly limited. For example, conventionally well-known methods can be cited.

The mixing ratio (mass ratio of first-pack liquid:second-pack liquid) of the first-pack liquid and second-pack liquid is preferably 10:0.5-2.0 from the viewpoint of providing further excellent effects of the invention.

(Substrate) Examples of the substrate to which the adhesive of the invention can be applied include plastic, glass, rubber, metals and the like.

As the substrate, a substrate including an olefin resin can be preferably cited.

The substrate including an olefin resin may be a substrate obtained from a mixture of an olefin resin and a filler. Examples of the filler include carbon fibers, glass such as a glass filler, talc, calcium carbonate and alumina.

Examples of plastic include a homopolymer, a copolymer and a hydrogenated product. These also apply for rubber.

Specific examples of plastic include an olefin resin such as polypropylene, polyethylene, ethylene-propylene copolymer, cycloolefin polymer (COP) and cycloolefin copolymer (COC); a polyester resin such as polyethylene terephthalate (PET) and polybutylene terephthalate (PBT); a polymethyl methacrylate resin (PMMA resin); a polycarbonate resin; a polystyrene resin; an acrylonitrile-styrene copolymer resin; a polyvinyl chloride resin; an acetate resin; an ABS resin (acrylonitrile butadiene styrene resin); and a polyamide resin.

COC means a cycloolefin copolymer such as a copolymer of olefin such as ethylene and tetracyclododecene, for example.

In addition, COP means, for example, a cycloolefin polymer such as a polymer obtained by subjecting norbornenes to ring-opening polymerization and hydrogenation.

Plastic may also be a poor adhesion resin.

The substrate may be surface treated. Examples of a surface treatment include a flame treatment, corona treatment and nitro treatment. The surface treatments are not particularly limited. For example, conventionally well-known methods can be used.

The method of applying the adhesive of the invention to a substrate is not particularly limited. For example, conventionally well-known methods can be used.

The adhesive of the invention can be cured with water included in the second-pack liquid or the catalyst, etc., that may be additionally included. The adhesive of the invention may be cured under the conditions of, for example, 5-90° C. and relative humidity (RH) of 5-95%.

(Application) Examples of application of the adhesive of the invention include a direct glazing agent, a sealant for automobiles and a sealant for construction members.

EXAMPLES

Hereinbelow, the invention will be specifically explained by way of examples. However, the invention is not limited thereto.

<Production of Two-Pack Urethane-Based Adhesive>

(First-Pack Liquid)

The components in the first-pack liquid section in table 1 below were mixed using the formulation (parts by mass) by means of a stirrer. The resulting mixture was obtained as a first-pack liquid.

(Second-Pack Liquid)

The components in the second-pack liquid section in table 1 below were mixed using the formulation (parts by mass) by means of a stirrer. The resulting mixture was obtained as a second-pack liquid.

Herein, in regard to the section relating to the "net CNF content (mass %) with respect to the water content" of the second-pack liquid, the "water content" is a total content of water added to the second-pack liquid and water included in the cellulose nanofibers (CNF)-containing substance.

Initial Second-Pack Liquid

Each of the second-pack liquids obtained in the above manner was provided as an initial second-pack liquid.

Stored Second-Pack Liquid

Each initial second-pack liquid was subjected to a storage test in which the same was left for 6 months under the condition of 40° C., to thereby obtain a stored second-pack liquid.

<<Evaluation on Second-Pack Liquid>>

With respect to the initial second-pack liquid and stored second-pack liquid which were obtained in the abovementioned manner, evaluation on the <thixotropic properties of the second-pack liquid> was carried out as described below. The results are shown in table 1.

With respect to the stored second-pack liquid obtained in the abovementioned manner, evaluation on <bleed out of the liquid components of the second-pack liquid> was carried out as described below. The results are shown in table 1.

<Thixotropic Properties of Second-Pack Liquid>

(Evaluation Method of Thixotropic Properties>

With respect to each of the initial second-pack liquid obtained in the abovementioned manner, the viscosity at a rotation rate of 1 rpm and 10 rpm was measured by using a BS-type viscometer, No. 7 rotor under the condition of 25° C., and from the measurement results, the ratio of viscosity at 1 rpm/viscosity at 10 rpm was determined.

(Evaluation Standard for Thixotropic Properties)

In regard to the thixotropic properties of the initial second-pack liquid, a case where the ratio of viscosity at 1 rpm/viscosity at 10 rpm was 6.5 or more was evaluated as "excellent initial thixotropic properties" and indicated as "O".

A case where the ratio of viscosity at 1 rpm/viscosity at 10 rpm was less than 6.5 was evaluated as "poor initial thixotropic properties" and indicated as "X".

Also, in regard to the stored second-pack liquid, the viscosity measurement was carried out in the same manner as in for the initial second-pack liquid, and the same evaluation standard for thixotropic properties was used to perform evaluation.

(Evaluation Standard for Suppression of Deterioration in Thixotropic Properties of Second-Pack Liquid)

When both of the ratio of viscosity at 1 rpm/viscosity at 10 rpm of the initial second pack-liquid and the ratio of viscosity at 1 rpm/viscosity at 10 rpm of the stored second pack-liquid were 6.5 or more, it was evaluated that deterioration in the thixotropic properties of the second-pack liquid was suppressed.

As above, when the both ratios are 6.5 or more, it was evaluated that the smaller the difference between the ratio of viscosity at 1 rpm/viscosity at 10 rpm of the initial second pack-liquid and the ratio of viscosity at 1 rpm/viscosity at 10 rpm of the stored second pack-liquid, the better the suppression of deterioration in thixotropic properties of the second-pack liquid.

Meanwhile, when the ratio of viscosity at 1 rpm/viscosity at 10 rpm of the stored second pack-liquid was less than 6.5, it was evaluated that deterioration in the thixotropic properties of the second-pack liquid could not be suppressed.

In addition, when both of the ratio of viscosity at 1 rpm/viscosity at 10 rpm of the initial second pack-liquid and the ratio of viscosity at 1 rpm/viscosity at 10 rpm of the stored second pack-liquid were less than 6.5, it was evaluated that the second-pack liquid had poor thixotropic properties and deterioration in the thixotropic properties of the second-pack liquid could not be suppressed.

<Bleed Out of Liquid Components of Second-Pack Liquid>

After the storage test, the stored second-pack liquid was observed by eye.

(Evaluation Standard for Bleed Out of Liquid Components of Second-Pack Liquid)

When no bleed out of liquid components was observed on the surface of the stored second-pack liquid, it is indicated as "O".

When bleed out of liquid components was observed on the surface of the stored second-pack liquid, it is indicated as "X".

(Mixing of First-Pack Liquid and Second-Pack Liquid)

Next, the first-pack liquid produced in the above manner and the second-pack liquid produced in the above manner were mixed at a mixing ratio shown in the "first-pack liquid: second-pack liquid mixing ratio (mass ratio)" section in table 1 in order to obtain a mixture of two-pack urethane-based adhesive.

In addition, when these were mixed at a mixing ratio described as above, the molar ratio, B/A, of (A) the number of moles of the isocyanate group of the urethane prepolymer in the first-pack liquid and (B) the number of moles of the active hydrogen of the active hydrogen compound in the second-pack liquid is shown together in the "molar ratio B/A" section in table 1.

<Preparation of Test Piece>

(Initial Test Piece)

A surface treated (corona treated), talc-containing polypropylene resin (trade name: TSOP #5, manufactured by Prime Polymer Co., Ltd., width: 25 mm, length: 100 mm, thickness: 3 mm) was subjected to a primer treatment by using a primer (trade name: RC-50E, manufactured by The Yokohama Rubber Co., Ltd.) in order to prepare a primer-treated substrate.

Next, the mixture of the two-pack urethane-based adhesive was applied to the primer-treated face of the substrate in such a way to form a triangular bead with a width of 8 mm, length of 100 mm and height of 12 mm, then a release paper was placed, and the adhesive layer was flattened so that the thickness of the adhesive layer was 3 mm.

Thereafter, the product was left for 3 days under the conditions of 20° C. and 65' RH in order to prepare an initial test piece.

(Heat-Aged Test Piece)

Heat Aging Test

The initial test piece was left for 366 hours under conditions of 90° C. for heat aging test, to thereby obtain a heat-aged test piece.

(Hydrothermal-Aged Test Piece)

Hydrothermal Aging Test

The initial test piece was immersed in hot water at 90° C. for 366 hours for hydrothermal aging test, to thereby obtain a hydrothermal-aged test piece.

<Evaluation on Adhesiveness>

The test pieces produced as above were subjected to evaluation on adhesiveness according to the method described below. The results are shown in table 1.

(Manual Peeling Test)

The test pieces prepared as above were subjected to a manual peeling test by peeling, from the test pieces, an adhesive layer formed by the two-pack urethane-based adhesive, in accordance with JASO standard (standard no. M338-89), and the state of destruction of each test piece was visually confirmed.

Evaluation Standard for Initial Adhesiveness

For the state of destruction of the initial adhesion test piece after the manual peeling test, the CF ratio (proportion of the cohesion failure (CF) area with respect to the total adhesion face, unit %) was evaluated.

"Initial adhesiveness is extremely superior"

According to the invention, a case where the CF ratio of the initial test piece was 80% or more was evaluated as the "initial adhesiveness is extremely superior", and this is indicated as "⊚".

"Initial adhesiveness is superior"

A case where the CF ratio was 60% or more and less than 80% was evaluated as the "initial adhesiveness is superior", and this is indicated as "○".

"Initial adhesiveness is bit poor"

A case where the CF ratio was 40% or more and less than 60% was evaluated as the "initial adhesiveness is bit poor", and this is indicated as "Δ".

"Initial adhesiveness is very poor"

A case where the CF ratio was less than 40% was evaluated as the "initial adhesiveness is very poor", and this is indicated as "X".

For the adhesiveness (adhesiveness after heat aging) of the heat-aged test piece, the manual peeling test was carried out in the same manner as for the initial adhesiveness above, and evaluation was carried out according to the same standard used for evaluating the initial adhesiveness.

For the adhesiveness (adhesiveness after hydrothermal aging) of the hydrothermal-aged test piece, the manual peeling test was carried out in the same manner as for the initial adhesiveness above, and evaluation was carried out according to the same standard used for evaluating the initial adhesiveness.

(Evaluation Standard for Adhesiveness after Aging)

When both of the adhesiveness after heat aging and adhesiveness after hydrothermal aging were graded as "○" or higher (CF ratio: 60% or higher), it was evaluated as excellent adhesiveness after aging.

Meanwhile, when the evaluation result of either or both of the adhesiveness after heat aging or adhesiveness after hydrothermal aging was "Δ" or lower (CF ratio: less than 60%), it was evaluated as poor adhesiveness after aging.

TABLE 1

|  |  | Comparative Example 1 | Example 1 | Example 2 | Comparative Example 2 | Example 3 | Example 4 |
|---|---|---|---|---|---|---|---|
| First-pack liquid | Urethane prepolymer-containing substance | 42.6 | 42.6 | 42.6 | 42.6 | 42.6 | 42.6 |
|  | Carbon black | 21.1 | 21.1 | 21.1 | 21.1 | 21.1 | 21.1 |
|  | Calcium carbonate 1 | 19.2 | 19.2 | 19.2 | 19.2 | 19.2 | 19.2 |
|  | Plasticizer | 16.5 | 16.5 | 16.5 | 16.5 | 16.5 | 16.5 |
|  | Tertiary amine compound 1 | 0.6 | 0.6 | 0.6 | 0.6 | 0.6 | 0.6 |
|  | Bismuth-based metal complex | 0.005 | 0.005 | 0.005 | 0.005 | 0.005 | 0.005 |
|  | Total | 100.00 | 100.00 | 100.00 | 100.00 | 100.00 | 100.00 |
| Second-pack liquid | Trifunctional polyether polyol | 62.0 | 62.0 | 62.0 | 62.0 | 62.0 | 62.0 |
|  | Tetrafunctional polyether polyol | 3.0 | 3.0 | 3.0 | 3.0 | 1.5 | 3.0 |
|  | Monoether polyol |  |  |  |  | 4.0 |  |
|  | Water | 1 | 1 | 1 | 1 | 1 | 1 |
|  | Cellulose nanofiber (CNF)-containing substance | 0 | 0.1 | 1 | 10 | 0.1 | 0.1 |
|  | Calcium carbonate 2 | 29 | 29 | 29 | 29 | 29 | 29 |
|  | Hydrophilic silica | 4.7 | 4.7 | 4.7 | 4.7 | 4.7 | 4.7 |
|  | Tertiary amine compound 2 | 0.25 | 0.25 | 0.25 | 0.25 | 0.25 | 0.25 |
|  | Tin-based metal complex | 0.05 | 0.05 | 0.05 | 0.05 | 0.05 | 0.05 |
|  | Total | 100.00 | 100.10 | 101.00 | 110.00 | 102.60 | 100.10 |
|  | Net CNF content (mass %) with respect to water content | 0 | 0.182 | 1.010 | 1.852 | 0.182 | 0.182 |
| Evaluation on Second-pack liquid | Thixotropic properties of initial second-pack liquid | 7.5 (X) | 7.5 (○) | 7.5 (○) | 5.5 (X) | 7.3 (○) | 7.5 (○) |
|  | Thixotropic properties of stored second-pack liquid (thixotropic properties after stored for 6 months at 40° C.) | 6.0 (X) | 7.0 (○) | 7.2 (○) | 5.0 (X) | 7.1 (○) | 7.0 (○) |
|  | Bleed out of liquid components of second-pack liquid (observation carried out after stored for 6 months at 40° C.) | X | ○ | ○ | ○ | ○ | ○ |

TABLE 1-continued

|  |  |  | Comparative Example 1 | Example 1 | Example 2 | Comparative Example 2 | Example 3 | Example 4 |
|---|---|---|---|---|---|---|---|---|
| First-pack liquid:Second-pack liquid mixing ratio (mass ratio) |  |  | 10:1 | 10:1 | 10:1 | 10:1 | 10:1 | 10:2 |
| Molar ratio B/A (at the first-pack liquid:Second-pack liquid mixing ratio, the molar ratio of (A) the number of moles of the isocyanate group of the urethane prepolymer in the first-pack liquid and (B) the number of moles of the active hydrogen of the active hydrogen compound in the second-pack liquid) |  |  | 0.41 | 0.41 | 0.40 | 0.37 | 0.72 | 0.81 |
| Initial Adhesiveness |  |  | ◎ | ◎ | ◎ | ◎ | ◎ | ◎ |
| Adhesiveness after aging | Adhesiveness after heat aging | 336 hours at 90° C. | ◎ | ◎ | ◎ | Δ | ○ | ○ |
|  | Adhesiveness after hydrothermal aging | 336 hours in 90° C. water | ◎ | ◎ | ◎ | X | ○ | ○ |

Details of the components shown in table 1 are as follows:

((First-Pack Liquid))

Urethane prepolymer-containing substance: 210 g of dioctyl adipate were added as a plasticizer to 267 g of polyoxypropylene diol having a hydroxyl value of 56 mg KOH/g (trade name: EXCENOL 2020, manufactured by AGC) and 519 g of polyoxypropylene triol having a hydroxyl value of 28 mg KOH/g (trade name: EXCENOL 3030, manufactured by AGC), further, 110 g of 4,4'-diphenylmethane diisocyanate (MDI) (Sumidur 44S, manufactured by Sumika Covestro Urethane Co., Ltd.) were added thereto, and the mixture was reacted at 80° C. for 5 hours, in order to obtain the urethane prepolymer-containing substance including a urethane prepolymer and a plasticizer. The urethane prepolymer included in the urethane prepolymer-containing substance has an isocyanate group at the terminal.

The content of the isocyanate group in the urethane prepolymer-containing substance was 1.36 mass %.

Carbon Black: Niteron #200 (trade name), manufactured by Nippon Steel Chemical Carbon Co., Ltd.

Calcium carbonate 1: Heavy calcium carbonate. SL-100 (trade name), manufactured by Takehara Kagaku Kogyo Co., Ltd. Specific surface area of 0.8 m²/g Plasticizer: Diisononyl phthalate (DINP), manufactured by J-PLUS Co., Ltd.

Tertiary amine compound 1: Dimorpholinodiethyl ether (DMDEE), UCAT-660M (trade name), manufactured by San-Apro Ltd.

Bismuth-based metal complex: Bismuth trioctate. Neostan U-600 (trade name), manufactured by Nitto Kasei Co., Ltd.

((Second-Pack Liquid))

(Active Hydrogen Compound)

Trifunctional polyether polyol: Polyoxypropylene triol. Preminol 7001K (trade name), manufactured by AGC. This has three hydroxy groups in one molecule. It is liquid under room temperature conditions (23° C.).

Tetrafunctional polyether polyol: EXENOL 450ED (trade name), manufactured by AGC. A compound represented by the following formula (4) which has four hydroxy groups in one molecule. Weight average molecular weight of 550. This is liquid under room temperature conditions (23° C.).

[Chemical Formula 4]

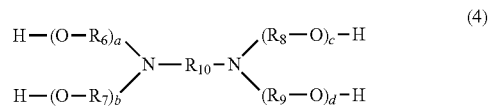

(4)

In formula (4), $R_6$ to $R_9$ each independently represent a propylene group, $R_{10}$ represents an ethylene group, and a to d each independently represent 1 to 10. At least one of a to d is 3 or greater.

Monoether polyol: Adeka Polyether BM-34 (trade name), manufactured by ADEKA Corporation. A compound represented by the following formula (5) which has four hydroxy groups in one molecule. Weight average molecular weight of 280. This is liquid under room temperature conditions (23° C.).

[Chemical Formula 5]

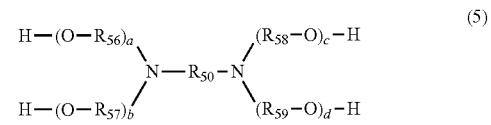

(5)

In formula (5), $R_{56}$ to $R_{59}$ each independently represent a propylene group and/or ethylene group, $R_{50}$ represents an ethylene group, and a to d each independently represent 1 or 2. At least one of a to d is 2.

Water: Distilled water

Cellulose nanofiber (CNF)-containing substance: Rheocrysta I-2SP (trade name), manufactured by DKS Co., Ltd. CNF content of 2% by mass. A mixture of water and CNF modified with a carboxy group (the carboxy group may be a carboxy ion or salt). The thickness of CNF is 3 nm, and the length of CNF is 1 μm.

Calcium carbonate 2: Calcium carbonate surface treated with a fatty acid. Kalfain 200 (trade name), manufactured by Maruo Calcium Co., Ltd.

Hydrophilic silica: Leolosil QS102S (trade name), manufactured by Tokuyama Corporation Tertiary amine compound 2: 2-Methyl triethylenediamine (Methyl Dabco). Manufactured by Air Products and Chemicals, Inc.

Tin-based metal complex: Dibutyltin dilaurate. Neostan U-100, manufactured by Nitto Kasei Co., Ltd.

As is clear from the results shown in table 1, bleed out of liquid components in the second-pack liquid and deterioration in thixotropic properties of the second-pack liquid could not be suppressed in comparative example 1 which did not contain cellulose nanofibers. In regard to the stored second-pack liquid of comparative example 1, as mentioned above, bleed out of liquid components was observed on the surface of the stored second-pack liquid. The liquid components bled out was analyzed by means of gas chromatography (GC), and as a result, it was found out that water and tetrafunctional polyether polyol were included in the liquid components.

In comparative example 2 in which the content of the cellulose nanofibers was outside the predetermined range, the second-pack liquid exhibited poor thixotropic properties, deterioration in thixotropic properties of the second-pack liquid could not be suppressed, and poor adhesiveness after aging of a cured product obtained was shown.

On the other hand, with the adhesive of the invention, bleed out of liquid components of the second-pack liquid and deterioration in thixotropic properties of the second-pack liquid were suppressed, and excellent adhesiveness after aging of a cured product obtained was shown.

The invention claimed is:

1. A two-pack urethane-based adhesive comprising:
    a first-pack liquid including a urethane prepolymer having an isocyanate group; and
    a second-pack liquid including water, an active hydrogen compound (except water) having an active hydrogen capable of reacting with the isocyanate group, and cellulose nanofibers,
    wherein the first-pack liquid and the second-pack liquid each independently contain carbon black and/or an inorganic-based filler, and
    the content of the cellulose nanofibers is 0.1-1.5 mass % with respect to the content of the water.

2. The two-pack urethane-based adhesive as claimed in claim 1,
    wherein the urethane prepolymer at least has a polyether skeleton, and
    the active hydrogen compound includes a polyether polyol.

3. The two-pack urethane-based adhesive as claimed in claim 1,
    wherein the molar ratio, B/A, of (A) the number of moles of the isocyanate group of the urethane prepolymer in the first-pack liquid and (B) the number of moles of the active hydrogen of the active hydrogen compound in the second-pack liquid is 0.1 or more and less than 1.0.

4. The two-pack urethane-based adhesive as claimed in claim 1, wherein the first-pack liquid and the second-pack liquid each independently further include a tertiary amine and a tin-based or bismuth-based metal complex.

5. The two-pack urethane-based adhesive as claimed in claim 1, wherein the content of water is 0.1-3.0 mass % in the second-pack liquid.

6. The two-pack urethane-based adhesive as claimed in claim 1, wherein the first-pack liquid and the second-pack liquid each independently include the carbon black and at least one selected from the group consisting of calcium carbonate and silica as the inorganic-based filler.

* * * * *